UNITED STATES PATENT OFFICE 2,578,293

4,4-DIPHENYL-2,5-OXAZOLIDINEDIONE

Robert Duschinsky, Essex Fells, N. J., assignor to Hoffmann-La Roche Inc., Nutley, N. J., a corporation of New Jersey No Drawing. Application November 17, 1949,
Serial No. 128,005

1 Claim. (Cl. 260—307)

The present invention relates to a new oxazolidinedione, namely, 4,4-diphenyl-2,5-oxazolidinedione and to methods for preparing same.

The new compound is characterized by its high stability as compared with known oxazolidinediones. It is useful as a valuable intermediate for preparing other organic compounds, such as the $\alpha$-amino-$\alpha,\alpha$-diphenylacetamides, and $\alpha$-amino-$\alpha,\alpha$-diphenylacetic acid esters described in my application Ser. No. 128,006 filed of even date herewith.

The 4,4-diphenyl-2,5-oxazolidinedione can be prepared by reacting $\alpha$-amino-$\alpha,\alpha$-diphenylacetic acid with a lower alkyl chloroformate, such as methyl chloroformate or ethyl chloroformate, and cyclizing the $\alpha$-carbalkoxyamino-$\alpha,\alpha$-diphenylacetic acid formed with thionyl chloride. In an alternative procedure, $\alpha$-amino-$\alpha,\alpha$-diphenylacetic acid is reacted with phosgene to obtain the 4,4-diphenyl-oxazolidinedione directly.

The following examples will serve to illustrate the invention:

Example 1

To a solution of 41.7 grams of $\alpha$-amino-$\alpha,\alpha$-diphenylacetic acid in 200 cc. of 1 N sodium hydroxide there were added in portions with stirring 1 N sodium hydroxide and ethyl chloroformate until a total of 615 cc. of sodium hydroxide and 56.6 grams of ethyl chloroformate had been used. 400 cc. of ether were then added and the mixture was acidified with 80 cc. of 5 N hydrochloric acid and shaken. The ether layer was separated, the aqueous layer was extracted with 200 cc. of ether, and the combined ether layers were dried over sodium sulfate, and evaporated. The resulting oily residue upon cooling yielded crude crystalline $\alpha$-carbethoxyamino-$\alpha,\alpha$-diphenylacetic acid, a sample of which upon recrystallization from benzene-petroleum ether, melted at 152–153° C. The $\alpha$-carbethoxyamino-$\alpha,\alpha$-diphenylacetic acid was mixed with 50 cc. of thionyl chloride and heated for 30 minutes at 80° C. by which time gas evolution had stopped and crystals had begun to separate. Excess thionyl chloride was evaporated and the residue was crystallized by mixing with 150 cc. of benzene and gradual addition of 150 cc. of petroleum ether. The mother liquor yielded a second crop of crystals upon evaporation, and addition of petroleum ether. The 4,4-diphenyl-2,5-oxazolidinedione thus obtained melts at 166–167° C.

Example 2

A solution of 2.27 grams of $\alpha$-amino-$\alpha,\alpha$-diphenylacetic acid in 20 cc. of 0.5 N sodium hydroxide was shaken with 5 cc. of a 20 per cent phosgene solution in xylene and 20 cc. of ether. After most of the phosgene was used up the xylene-ether layer was separated. To the aqueous layer 20 cc. of 1 N sodium hydroxide, 4 cc. of the 20 per cent phosgene solution, and 20 cc. of ether were added, the mixture shaken, and the xylene-ether layer separated. This operation was repeated three times. The xylene-ether layers were then combined, dried over sodium sulfate, and the ether was evaporated. The remaining xylene solution gave, upon addition of petroleum ether, crude 4,4-diphenyl-2,5-oxazolidinedione which was purified by crystallization from benzene.

I claim:
4,4-diphenyl-2,5-oxazolidinedione.

ROBERT DUSCHINSKY.

REFERENCES CITED

The following references are of record in the file of this patent:

UNITED STATES PATENTS

| Number    | Name    | Date          |
|-----------|---------|---------------|
| 2,327,162 | Baldwin | Aug. 17, 1943 |

FOREIGN PATENTS

| Number  | Country       | Date         |
|---------|---------------|--------------|
| 555,129 | Great Britain | Aug. 5, 1943 |

OTHER REFERENCES

Chem. Abstracts, vol. 41, pp. 5752$^e$ and 8776, citing Woodard, JCAS, vol. 69, pp. 1551–1552.

Beilstein, vol. 27, page 253.

Fuchs, Berichte 55, page 2943 (1922).